(12) United States Patent
Meng et al.

(10) Patent No.: US 9,902,005 B2
(45) Date of Patent: Feb. 27, 2018

(54) LOW-BORON-OXYGEN CUTTING LINE FOR ONE-WAY WIRE WINDING AND MANUFACTURING METHOD THEREOF

(71) Applicant: Ningbo Powerway Materialise Co., Ltd., Ningbo (CN)

(72) Inventors: Xianqi Meng, Ningbo (CN); Linhui Wan, Ningbo (CN); Huogen Lin, Ningbo (CN); Fanglin Guo, Ningbo (CN); Xiaojun Chen, Ningbo (CN)

(73) Assignee: NINGBO BODE HIGHTECH CO., LTD., Ningbo (CN)

( * ) Notice: Subject to any disclaimer, the term of this patent is extended or adjusted under 35 U.S.C. 154(b) by 288 days.

(21) Appl. No.: 14/732,794

(22) Filed: Jun. 8, 2015

(65) Prior Publication Data

US 2016/0221095 A1 Aug. 4, 2016

(30) Foreign Application Priority Data

Jan. 29, 2015 (CN) .......................... 2015 1 0044102
Feb. 10, 2015 (CN) .......................... 2015 1 0069132

(51) Int. Cl.
*B23H 7/08* (2006.01)
*B23K 7/00* (2006.01)
*C22C 9/04* (2006.01)
*B22D 21/02* (2006.01)
*B22D 11/00* (2006.01)
(Continued)

(52) U.S. Cl.
CPC .............. *B23H 7/08* (2013.01); *B22D 11/004* (2013.01); *B22D 21/025* (2013.01); *B23H 7/24* (2013.01); *B23K 7/005* (2013.01); *B32B 15/00* (2013.01); *C22C 9/00* (2013.01); *C22C 9/04* (2013.01); *C22C 18/02* (2013.01); *C22F 1/08* (2013.01)

(58) Field of Classification Search
CPC ... C22C 18/02; C22C 9/04; C22C 9/00; C22F 1/08; B23H 7/08; B23K 7/005; B32B 15/00; B22D 11/005
USPC ................ 428/389; 219/69.12, 69.11, 69.15; 148/262, 240, 253, 247
See application file for complete search history.

(56) References Cited

U.S. PATENT DOCUMENTS

| 7,723,635 | B2 * | 5/2010 | Shin ......................... | B23H 7/08 219/69.11 |
| 2005/0040141 | A1 * | 2/2005 | Ly ........................... | B23H 7/08 219/69.1 |

FOREIGN PATENT DOCUMENTS

| CN | 101439429 B | | 5/2009 |
| CN | 101439429 | * | 6/2010 |
| CN | 104191056 | * | 12/2014 |

* cited by examiner

*Primary Examiner* — Camie S Thompson
(74) *Attorney, Agent, or Firm* — Gokalp Bayramoglu

(57) ABSTRACT

A low-boron-oxygen cutting line for one-way wire winding and a manufacturing method are provided. A core material comprises 55-65 wt % of copper, 0.001-0.03 wt % of boron, 0.05-1.0 wt % of other elements which are at least two of titanium, iron, silicon, nickel, manganese, aluminum, tin, phosphorus and rare earth, less than 0.5 wt % of inevitable impurity elements, and an allowance of zinc; and a surface comprises 35.0-45.0 wt % of copper, 0.001-3.0 wt % of oxygen, 0.0005-0.5 wt % of other elements, at least two of which are titanium, iron, silicon, nickel, manganese, aluminum, tin, phosphorus and rare earth, less than 0.5 wt % of inevitable impurity elements, and an allowance of zinc. The cutting line has improved mechanical properties and strengthened discharge properties, and can cut irregularly shaped materials or those hollowed in the middle.

7 Claims, 3 Drawing Sheets

(51) Int. Cl.
*C22F 1/08* (2006.01)
*C22C 9/00* (2006.01)
*B23H 7/24* (2006.01)
*B32B 15/00* (2006.01)
*C22C 18/02* (2006.01)

LOW-BORON-OXYGEN CUTTING LINE FOR ONE-WAY WIRE WINDING AND MANUFACTURING METHOD THEREOF

TECHNICAL FIELD

The present invention relates to a low-boron (boron: 0.001-0.03 wt %)-oxygen cutting line for one-way wire winding (electro discharge machining) and a manufacturing method thereof.

BACKGROUND

Electro discharge machining for one-way wire winding is an accurate mechanical machining method quickly developed in recent years. Electro machining was initially invented in 1943 by Mr. and Mrs. Lazarenko, scholars of the former Soviet Union, and later quickly developed along with improvement of the pulse power supply and control systems. Electro discharge machining is a special machining method, using electric corrosion that is generated when two electrodes immersed in the working solution performs pulse discharge there-between to corrode and remove conductive materials, so this technology is also called electric discharge machining.

In accordance with the shapes of the tool electrodes and the features of the relative movement between the tool electrodes and workpieces, electro discharge machining can be classified into five types: electro discharge cutting; electro discharge forming; electro discharge grinding; electro discharge conjugate revolution machining; hole machining, stamp marking, surface alloying, surface strengthening, etc. According to different wire winding speed, electro discharge cutting can be classified into quick electro discharge machining, intermediate electro discharge machining and one-way electro discharge machining. The present invention mainly describes the last electro discharge machining.

The development of the slow-wire-winding electric discharge machining (also called one-way-wire-winding electro discharge machining at home) is inseparable from the synchronous development of the cutting wire technology. Popular one-way wire winding lathes at present are designed according to the working features of the cutting line, and the breakthrough of the cutting line technology usually leads to innovation of the design of the line cutting machines. From the original oxygen-free copper wire cutting to the present cutting-line cutting, one-way wire-winding cutting experienced a very long time from low quality, low-efficiency production to high-efficiency, high-quality, automatic and specialized production. The line cutting technology in our country is developed on the basis of gradually importing overseas advanced technologies, from the earliest quick-wire-winding, intermediate-wire-winding to the present popular one-way-wire-winding electro discharge machining, experiencing a low-to-high development process. As mentioned above, the development of the cutting line technology determines the development direction of the cutting technology. To solve the task of how to research and develop the cutting line, the principle of electro discharge machining shall be understood first. During electro discharge machining, one electrode of the pulse power supply is connected with a tool electrode, and the other electrode is connected with a workpiece electrode. Both electrodes are immersed in a liquid medium with certain insulation (usually kerosene, mineral oil or deionized water; for the one-way-wire-winding cutting, deionized water is preferred). The tool electrode is controlled by an automatic feeding regulator to ensure that the tool and the workpiece maintain a very small discharge spacing (0.01~0.05 mm) during normal machining. When a pulse voltage is applied between the two electrodes, the liquid medium at the nearest point between the two points is broken down in the current conditions, forming a discharge channel. Due to very small cross section of the channel and very short discharge time, the energy is highly concentrated (10~107 W/mm), and the instant high temperature generated in the discharge area can melt and even evaporate the material to form electrically corroded pits. At end of the first pulse discharge, the second pulse breaks down and discharges at the nearest point at another electrode in a very short time period. Such cycle proceeds at a very high frequency. The tool electrode is continuously fed to the workpiece, and its moving shape is finally copied on the workpiece to form the required machining shape. At the same time, a small part of the total energy is released to the tool electrode, causing tool loss. The lost tool electrode is discharged continuously, while the new, intact tool electrode is fed without stopping, so the shape of the cutting tool electrode is kept at a dynamic balance, thus ensuring the dimensional accuracy and surface smoothness of the workpiece.

As the material machining technology and the mechanical machining technology are continuously improved, the cutting line experiences conversion from a common brass cutting line to clad cutting line, and even a multi-layer composite cutting line under research. The research of the clad cutting line all depends on the principle of the discharge machining. Coatings and coating structures of different compositions are applicable to the cutting of different types of materials.

For mechanical machining, the pursuit of accuracy is a main task at present. Production management personnel consider how to improve efficiency. For one-way-wire-winding discharge machining, the machining accuracy may be reduced while the speed is enhanced, and when the processing accuracy is improved, the processing efficiency is inevitably reduced. Therefore, the cutting line in the present invention is applicable to the cutting of irregularly shaped materials and those hollowed in the middle without affecting the processing accuracy, and the cut materials have high surface smoothness, with dimensional accuracy and form and location tolerance not lower than other types of one-way-wire-winding cutting line and with cutting speed improved.

The specific technologies of the cutting lines used at home and abroad are described below.

I. Common brass cutting line: Such cutting line is made of copper-zinc alloy. Limited by the zinc content in the brass, its cutting speed is restrained. As the zinc content in the brass increases, the cutting is enhanced a little, but the enhancement is limited because the higher the zinc content is, the bigger the processing difficulty is. Such a cutting line is usually employed by common users at home. If such a cutting line is used to cut irregularly shaped materials or those hollowed in the middle, the processing accuracy and surface quality will be restrained, and the cutting line is frequently broken, causing difficulty to the operations of the workers.

II. Galvanized cutting line: Such cutting line uses common brass as the core and has a layer of zinc on the outside. Zinc performs gasification during cutting, so the discharge of such cutting line is relatively stable, and the cut surface is smoother than that of the common brass wire. Mature manufactures are mainly located in the EU. Some manufacturers in our country can produce such cutting line. However, such cutting line has a problem with dusting. Manufacturers at home and abroad all face such problem. Because of dusting, the auxiliary procedure time during cutting is prolonged, reducing the processing efficiency. When such electrode wire cuts irregularly shaped materials or those hollowed in the middle, zinc dusting is more serious.

III. Speed type clad cutting wire: Such cutting line employs common brass as the core and copper-zinc alloy as the clad layer, which is a little bigger than that of the common galvanized cutting line. The speed of such clad cutting wire is higher than the cutting speed of the common galvanized cutting wire. Such cutting wire is applicable to high-efficiency machining. The core material of such cutting wire is common brass with relatively low tensile strength, so it is difficult to ensure the form and location tolerance during cutting.

IV. β Cutting wire: Through research, it is found that cutting lines with uniform pits (cracks) can improve the discharge effect. To meet this need, such cutting with porous structure on the surface is generated. The core material of the diffusion annealing type cutting is oxygen-free copper or brass copper alloy and is covered with a layer of copper-zinc alloy on the outside through diffusion annealing, wherein the ratio of the copper and zinc is 1:1; the core material is oxygen-free copper or brass copper alloy, with the porous surface formed by diffusion annealing. The tissue of the surface material of the cutting line is β phase, therefore the cutting line is usually called β type cutting line. As everyone knows, the zinc content of the β phase is less than 50% at room temperature. The metal surface of the cutting line is β phase tissue. The β phase is brittle phase, so the roughness of the cutting line is poor, and such cutting line usually does not work or breaks when cutting irregularly shaped materials or those hollowed in the middle.

. γ type cutting line: According to the research, the surface tissue is γ phase cutting line with high surface cutting accuracy, therefore the zinc content of the γ phase is about 60%. Such cutting line is called a γ type cutting line. The cutting line of such structure has a high zinc content and the electro discharge interval is small, so on the micro-level, the electro corroded pits are relatively small, and reflected on the macro-level, the cutting smoothness of this line is relatively high. On the other side, the γ phase has high zinc content, but the electric corroding speed of the zinc is relatively high, and zinc is quickly consumed in the cutting process. Likewise, the cutting line usually does not work or break when cutting the irregularly shaped materials or those hollowed in the middle.

VI. Composite phase type cutting line: Such cutting line has β and γ phases on the surface and therefore is also called composite type cutting line. Such cutting line combines the advantages of the β and γ type cutting lines, and has cutting speed and cutting accuracy improved at the same time. Only a few industrially advanced countries in the world can produce such cutting line. The mixture of β and γ phases is required, so the manufacturing cost is relatively high. Because of the use cost, such cutting line is hardly used in the world.

SUMMARY OF THE INVENTION

Aimed at the defects in the prior art, the present invention provides a low-boron-oxygen cutting line for one-way wire winding that is of low manufacturing cost, is applicable to cutting irregularly shaped materials or those hollowed in the middle and has a high cutting efficiency and cutting accuracy, and a manufacturing method thereof.

To solve the above technical problems, the present invention employs the following technical solution: A low-boron-oxygen cutting line for one-way wire winding comprises a core material and a metal surface layer covering the core material; the core material has an alloy composition of 55-65 wt % of copper, 0.001-0.03 wt % of boron, 0.05-1.0 wt % of other metal elements, at least two of which are titanium, iron, silicon, nickel, manganese, aluminum, tin, phosphorus and rare earth (those other metal elements are added in any ratio as long as the total content is ensured to be in the scope of 0.05-1.0 wt %), less than 0.5 wt % of inevitable impurity elements, and an allowance of zinc; the metal surface layer has an alloy composition of 35.0-45.0 wt % of copper, 0.001-3.0 wt % of oxygen, 0.0005-0.5 wt % of other metal elements which are at least two titanium, iron, silicon, nickel, manganese, aluminum, tin, phosphorus and rare earth, less than 0.5 wt % of inevitable impurity elements, and an allowance of zinc. In a first preferable solution, the core material has an alloy composition of 55-60 wt % of copper, 0.001-0.01 wt % of boron, 0.05-0.5 wt % of other elements, at least two of which are iron, phosphorus and rare earth and less than 0.3 wt % of inevitable impurity elements, the sum of the contents of the copper, zinc and boron is less than 99.5 wt %, wherein zinc contents is greater than 39.5 wt %; the metal surface layer has an alloy composition of 40-45 wt % of copper, 0.001-3.0 wt % of oxygen, 0.0005-0.25 wt % of other elements, at least two of which are iron, phosphorus and rare earth and less than 0.3 wt % of inevitable impurity elements, and an allowance of zinc.

In a second preferable embodiment, the core material has an alloy composition of 60-65 wt % of copper, 0.005-0.03 wt % of boron, 0.05-0.5 wt % of other elements, at least two of which are iron, phosphorus and rare earth and more than 0.3 wt % of inevitable impurity elements, the sum of the contents of the copper, zinc and boron is less than 99.5 wt %, wherein zinc contents is greater than 34.5 wt %; the metal surface layer has an alloy composition of 35-40 wt % of copper, 0.10-3.0 wt % of oxygen, 0.0005-0.25 wt % of other elements, at least two of which are iron, phosphorus and rare earth and less than 0.3 wt % of inevitable impurity elements, and an allowance of zinc. The present invention also provides a manufacturing method of the low-boron-oxygen cutting line for one-way wire winding. Raw materials are weighed according to the formula, comprising metal elements and other metal elements for refined crystalline strengthening. A conventional alloying melting technology in the industry is employed to continuously cast the raw materials into brass rod blanks at a temperature of 950-1,150° C., and the brass rod blank is plastically machined, re-crystallized and annealed to generate the core material. The core material is covered with a layer of zinc to form the raw blank (as shown in FIG. 2) through chemical electroplating or mechanical means. The raw blank is thermally processed in a heating furnace in the oxidizing atmosphere with oxygen content of 10-90 wt % and at a thermal pressure of 0.5-12.5 PMa and at a temperature of 250-450° C. Then, the blank is kept at the temperature of 250-450° C. for 2.0-15.0 h, and then cooled to 60° C. as the furnace cools down to generate the metal surface layer containing the copper, zinc and oxygen in the surface (as shown in FIG. 3). The composite material manufactured using the above method is continuously annealed with large power to produce the final cutting wire for one-way wire winding.

Other elements in the surface metal in the present invention are formed in this way: after the surface metal is thermally processed, a part of other elements in the alloy core material seep into the surface metal to realize retention in the surface layer.

The present invention has the following advantages and beneficial effects.

1. The metal core material of the present invention employs is manufactured by the alloying continuous casting melting technology, added with a trace of boron element. The sequence number of the boron element in the periodic table of elements is 5, and the atom radius is very small; the sequence number of zinc in the periodic table of elements is 30, and the atom radius is much bigger than that of boron. During cutting, the metal surface is consumed at first. If the metal core material is continuously consumed after the metal surface is consumed, the cutting line declines in tensile strength and mechanical properties, and the cutting becomes more difficult. With the boron element having a small atom radius, the boron atoms quickly occupy the hollow space left by the zinc atoms when the zinc in the metal core material is just consumed, thus protecting the metal core materials from being consumed and also ensuring that the properties of the core materials are not reduced.

2. The metal core materials of the present invention are processed with refined crystal strengthening technology. The added metal elements including titanium, iron, silicon, nickel, manganese, aluminum, tin, phosphorus and rare earth can deoxidize to enhance the purity of the core material, and also refine the crystal particles to make the crystal particles smaller, thus improving the mechanical properties of the materials. The improvement of the mechanical properties is also good for ensuring the form and location tolerance of the materials.

3. The copper content in the metals of the core material in the present invention is 55-65 wt %, the zinc content is 34.5-44.5 wt %, and the content of the titanium, iron, silicon, nickel, manganese, aluminum, tin, phosphorus and rare earth does not exceed 1.0 wt %. According to such ingredient ratio, the materials have relatively low cost without the reduction of the mechanical properties, and are easy to produce and applicable to industrial production.

4. In the present invention, the metal surface contains 0.005-3.0 wt % of oxygen. The oxygen element, copper and zinc form oxide copper, cuprous oxide, zinc peroxide, and zinc oxide. Those metal compounds block extension of the copper and zinc in the metal surface, ensures discharge at intervals during cutting, and plays the role of cooling and chip removal during discharge machining. The principle of chip removal and cooling is as follows. During discharge, zinc is first corroded because of its low gasification temperature, while copper oxide, cuprous oxide, zinc peroxide, and zinc oxide with a high melting point are left on the surface of the cutting line, ensuring no change to the shape of the cutting line. The pits left after zinc is corroded increase the surface area of the cutting line, while the increase of the surface area enlarges the heat dissipating area during discharge, and the energy gathered during cutting is easier to go away. In this way, the cutting speed of the cutting line is improved. The shape of the cutting line is not changed during discharge, which means that the shape of the tool electrode is not changed, so the form and location tolerance of the cut materials is improved in comparison with that of other types of cutting lines.

5. The zinc content in the metal surface of the present invention is higher than 50 wt %, and the gasification property is strengthened during discharge, helping improve the surface smoothness in the process of cutting.

6. In the present invention, the zinc covered material is thermally processed in the oxidizing atmosphere, so the material performs incomplete recrystallization and chemical reactions. The temperature for the incomplete recrystallization is selected according to the copper content in the core material, ensuring no decline in the comprehensive mechanical properties of the materials because the mechanical properties of the final products cannot meet the requirements for the properties of the cutting line after the mechanical properties have declined.

7. In the present invention, the aerobic thermal treatment proceeds in a oxidizing atmosphere, the oxygen atoms fully flow into the metal surface at a high temperature and react with the metal in the material to form copper oxide, cuprous oxide, zinc peroxide, and zinc oxide, and the zinc atoms on the surface react with the copper atoms in the core material electrochemically react to generate a copper-zinc-oxide composite layer on the surface. Such composite layer contributes to the discharge effect during discharge machining. The metallographic analysis of the composite layer can be seen in FIG. 4.

8. In the present invention, the materials covered with zinc on the surface is thermally processed; a part of the titanium, iron, silicon, nickel, manganese, aluminum, tin, phosphorus and rare earth elements added in the core material seep into the surface layer. During discharge, the zinc in the metal layer of the surface is consumed first, and those added elements are left because of their high gasification temperature. Those remaining elements prevent the diameter tolerance of the cutting line from undergoing dramatic change, which means that the shape of the tool electrode is not changed. In this way, the form and location tolerance of the cut material is improved in comparison with other types of cutting lines.

9. The processing of the final finished product in the present invention employs large-power plastic processing and continuous annealing technology to ensure the conductivity and mechanical properties of the cutting line. The metallographic analysis of the finished product can be seen in FIG. 5.

10. The thickness of the copper-zinc-oxide composite layer of the surface is greater than 5% of the final diameter and smaller than 25% of the final diameter. If the composite layer is too thin, the improvement of the cutting effect is not obvious. If the composite layer is too thick, the mechanical properties of the material will be reduced, so the cutting becomes difficult and the line is easy to break.

11. The total conductivity of the low-boron-oxygen cutting line for one-way wire winding is greater than 18.5% IACS and less than or equal to 25.5% IACS. Keeping proper conductivity is good for stabilizing voltage during discharge and ensuring cutting stability.

12. The low-boron-oxygen cutting line for one-way wire winding of the present invention is a cutting line with mechanical properties improved and discharge properties strengthened, contributing to cutting of irregularly shaped materials or those hollowed in the middle. The cut materials have high surface smoothness and high dimensional accuracy and the form and location tolerance not lower than that of other types of cutting lines for one-way wire winding, and have improved cutting speed.

DETAILED DESCRIPTION OF THE INVENTION

Figure 1:
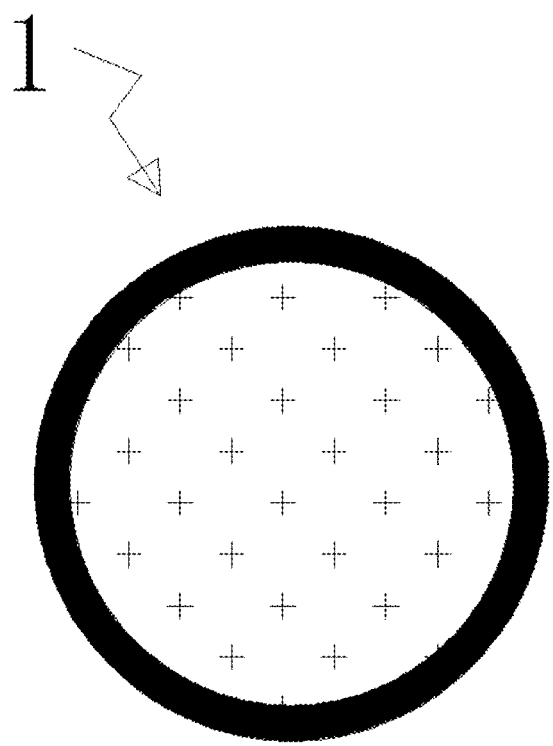
FIG. 1 is a schematic view of the cross section of cutting line 1 of the present invention.

The present invention is described in further detail with reference to an embodiment. However, the present invention is not merely limited to the following embodiment. The unit of the conductivity % IACS in the present invention is the international unit system.

MPa in the present invention is the unit of gas pressure.

wt % in the present invention is the quality percentage of materials, not volume percentage.

The refined crystal strengthening technology in the present invention works by using the modification manner. The method of improving the physical properties of metal materials through refining crystal particles is called refined crystal strengthening. Industrially, refined crystal strengthening is used to improve the material strength. The mechanism of the refined crystal strengthening technology in the present invention is as follows: usually, a metal is a polycrystal consisting of numerous crystal particles. The particle size of the crystal can be represented by the number of the crystal particles per unit volume. The larger the number is, the more refined the crystal particle is. Experiments show that the refined crystal metal at room temperature has better mechanical properties in comparison with coarse crystal particles. This is because when the refined crystal particle metal is stressed to generate plastic deformation, the external force can be resolved in more crystal particles. In such case, the plastic deformation is uniform, and the stress concentration is reduced. Besides, the more refined the crystal particle is, the larger the crystal boundary area is. The more winding the crystal boundary is, the more difficult the crank expansion is. Therefore, the roughness of the material is improved. Therefore, such material strengthening technology is called refined crystal strengthening. After the material is strengthened, the comprehensive properties are improved.

The following embodiments are used to prove cutting line structure and the manufacturing method of the cutting line in the present invention is practical.

Embodiment 1

To manufacture a cutting line A with a diameter D0 of 0.25 mm in the present invention, the core material comprises 58.5 wt % of copper, 0.0025 wt % of boron, 0.15 wt % of other metal elements which are iron and rare earth, less than 0.3 wt % of inevitable impurity elements and the allowance of zinc, and the metal surface comprises 41.0 wt % of copper, 0.015-1.2 wt % of oxygen, 0.001 wt % of rare earth, 0.08 wt % of iron, less than 0.3 wt % of inevitable impurity elements and the allowance of zinc.

Step 1: Purchase copper, zinc and boron in a raw materials market, choose the raw materials, mix the materials according to the requirements of the core material ingredients (wherein boron can be manufactured into intermediate alloy to be added), move the mixed materials to the melting site to melt the materials, control the melting temperature to be 950-1,150° C. and the traction speed to be 1.0-4.0 m/min to produce a continuous cast rod blank with a diameter of 6.0-16.0 mm.

Figure 2:
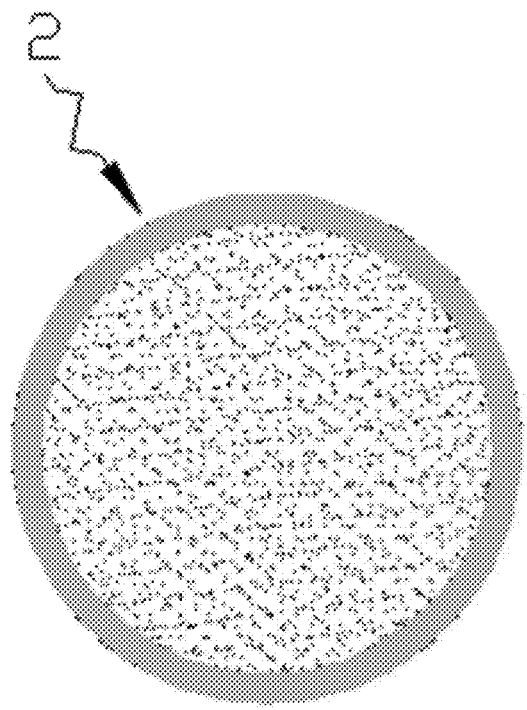
FIG. 2 is a schematic view of the cross section of the parent blank 2 of the present invention before thermal treatment.

After surface treatment, plastically machine, re-crystallize and anneal the above continuous cast rod for several cycles (those are conventional processes in the industry and therefore are not described in detail) to produce brass wires with a diameter of 1.2 mm and a copper content of 58.5 wt % (parent blank material 2 as shown in FIG. 2), and then cover a zinc layer with a thickness of 20 μm on the surface of the brass wire surfaces in a mechanical method (namely the conventional mechanical galvanizing method in the industry, for example the mechanical galvanizing process shown in http://www.docin.com/p-358650731.html).

Figure 3:
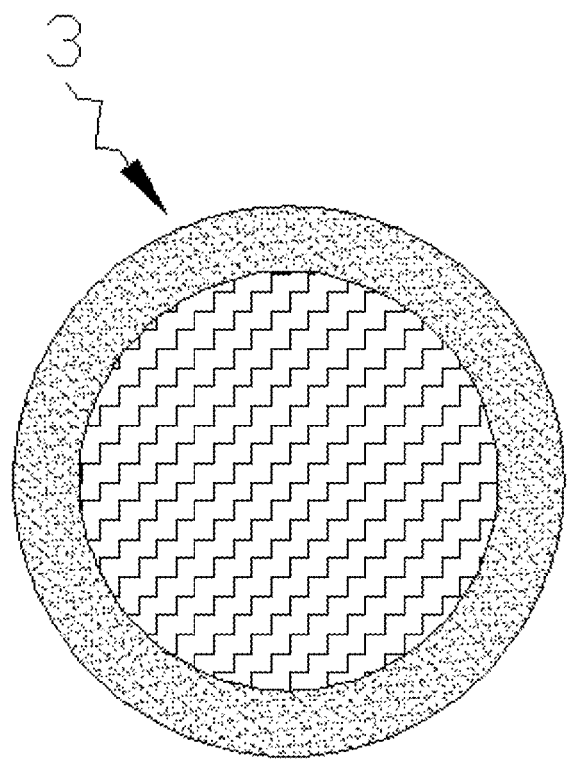
FIG. 3 is a schematic view of the cross section of the parent blank 3 of the present invention after thermal treatment.
Figure 4:
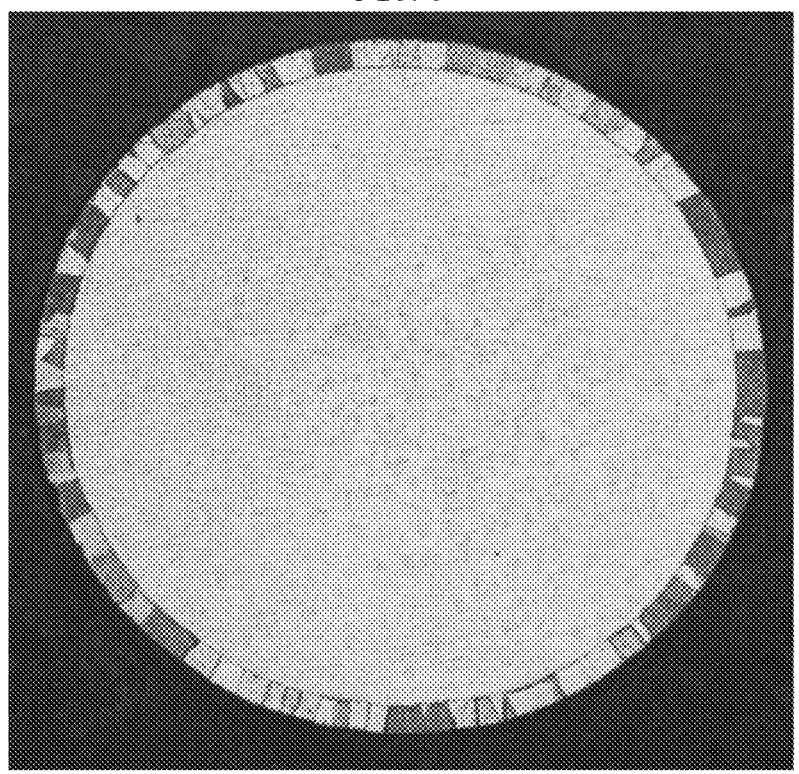
FIG. 4 is a metallograph of the cross section of the parent blank object of the present invention.

Step 2: Thermally process the materials obtained in step 1 on a heating surface with an oxygen content of 50% and at a gas pressure of 5 MPa and at a temperature of 360° C., keep the materials at the temperature of 360° C. for 5 h to form the materials (parent material 3 as shown in the FIG. 3, metallograph of the parent material can be seen in FIG. 4), cool to 60° C. along with the surface and then discharge out of the furnace.

Figure 5:
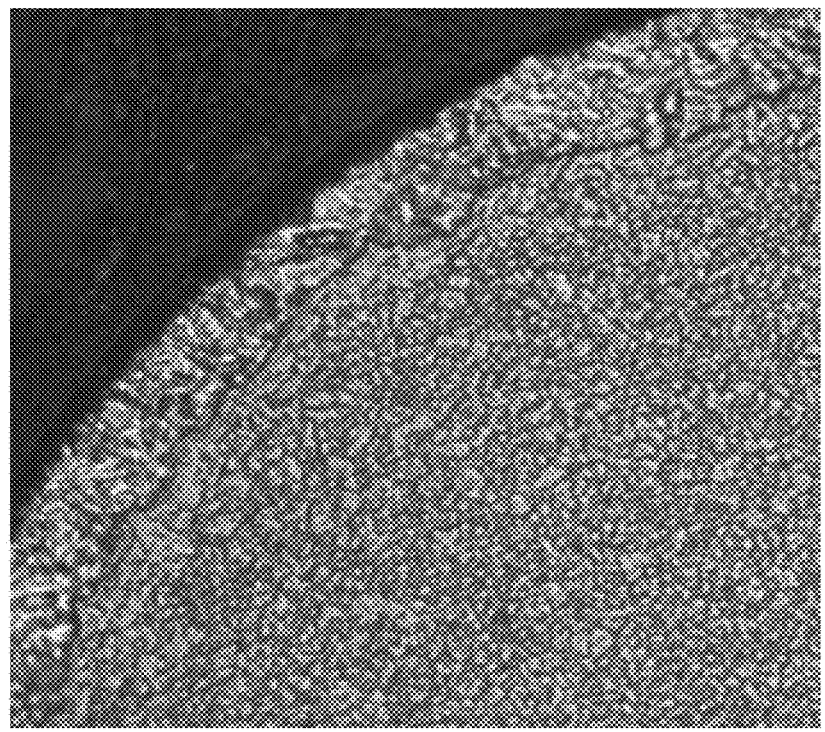
FIG. 5 is a metallograph of the cross section of cutting line 1 of the present invention.

Step 3: Stretch the parent material 3 manufactured in step 2 with large power, remove the stress and anneal the material using a continuous-stretching-annealing device. This process is specifically as follows: when the workpiece is processed at a temperature less than 650° C., the annealing speed (traction speed) is 850-1,500 m/min; the annealing distance is 0.5-10 m; then, the material undergoes the post treatment in the annealing liquid (the annealing liquid is also called burning oil in the industry, commercially available, for example German multidraw DG type, many domestic products, such as FX128, etc.); the temperature of the annealing liquid is 25-100° C.; reeling is also implemented; the finished product obtained through stretching is a cutting line with a diameter of 0.25 mm. FIG. 1 shows the cross section of the cutting line. The amplified metallograph can be seen in FIG. 5. The test result shows that the tensile strength of such cutting line is 955 N/mm².

The above specific melting, machining and stretching processes are conventional technologies in this industry, referring to the prior arts such as ZL200810163235.7.

1. Cutting line A is compared with any common brass cutting line available on the market.

2. The one-way wire winding machine used in the test is Mitsubishi FA10SADVANCE2009.

3. The test conditions are as follows: the size of the workpiece cut in the test is 60*6*6 (0.5*3 groove); the workpiece material is SKD11; the device parameter is NM; processing times include one time of course cutting and four times of fine trimming; the machining mode is immersion; the tension parameter of the device is adjusted to be applicable to 900 N/mm² cutting line; and the nozzle is pressed against the workpiece. The recorded cutting effects of the two types of cutting lines can be seen in table 1.

TABLE 1

Cutting effects of the two types of cutting lines in embodiment 1

| Type of the cutting line | Total machining time | First cut speed | First cut time | Roughness of the workpiece |
|---|---|---|---|---|
| Common brass wire | 38.4 point | 2.06-2.26 mm/min | 15.3 point | Ra = 0.351 |
| Cutting line A | 31.8 point | 2.40-2.666 mm/min | 13.4 point | Ra = 0.355 |

4. From table 1, it can be seen that the surface roughness of the workpieces is the basically the same. Calculated by the total cutting time, the cutting efficiency of the cutting line manufactured in this embodiment is improved by 14.17%, and the material used is difficult to machine, and the cost is obviously superior.

Embodiment 2

To manufacture a cutting line B with a diameter D0 of 0.25 mm in the present invention, the core material comprises 59.8.0 wt % of copper, 0.01 wt % of boron, 0.25 wt % of other metal elements which are iron and phosphorus, less than 0.3 wt % of inevitable impurity elements and the allowance of zinc, and the metal surface comprises 43.0 wt % of copper, 0.05-2.5 wt % of oxygen, 0.005 wt % of phosphorus, 0.18 wt % of iron, less than 0.3 wt % of inevitable impurity elements and the allowance of zinc.

Step 1: Purchase copper, zinc and boron in a raw materials market, choose and process the raw materials, mix the materials according to the requirements of the core material ingredients (wherein boron can be manufactured into intermediate alloy to be added), move the mixed materials to the melting site to melt the materials, and control the melting temperature to be 9.50-1,150° C. and the traction speed to be 1.0-4.0 m/min to produce a continuous cast rod blank with a diameter of 6.0-16.0 mm.

After surface treatment, plastically machine, re-crystallize and anneal the above continuous coast rod for several cycles to produce brass wires with a diameter of 1.2 mm and a copper content of 59.8 wt % (parent blank material 2), and then cover a zinc layer with a thickness of 25 μm on the surface of the brass wire surfaces in a chemical method.

Step 2: Thermally process the materials obtained in step 1 on a heating surface with an oxygen content of 30% and at a temperature of 370° C., keep the materials at the temperature of 370° C. for 12 h to form the materials (parent material 3), cool to 60° C. along with the surface and then discharge out of the furnace.

Step 3: Stretch the parent material 3 manufactured in step 2 with large power, remove the stress and anneal the material using a continuous-stretching-annealing device (when the workpiece is processed at a temperature of less than 650° C., the annealing speed (traction speed) is 850-1,500 m/min; the annealing distance is 0.5-10 m; then, the material undergoes post treatment in the annealing liquid (the annealing liquid is also called burning oil in the industry, and is commercially available, for example German multidraw DG type, domestic FX128, etc.); the temperature of the annealing liquid is 25-100° C.; reeling is also implemented; the finished product obtained through stretching a cutting line with a diameter of 0.25 mm. The test result shows that the tensile strength of such cutting line is 985 N/mm².

1. Cutting line B is compared with any gamma type brass cutting line available on the market.
2. The one-way wire winding machine used in the test is Mitsubishi FA10SADVANCE2009.
3. The test conditions are as follows: the size of the workpiece cut in the test is 60*6*6 (0.5*3 groove); the workpiece material is SKD11; the device parameter is NM; processing times include one time of course cutting and four times of fine trimming; the machining mode is immersion; the tension parameter of the device is adjusted to be applicable to 900 N/mm² cutting line; and the nozzle is pressed against the workpiece. The recorded cutting effects of the two types of cutting lines can be seen in table 2.

TABLE 2

Cutting effects of the two types of cutting lines in embodiment 2

| Type of the cutting line | Total machining time | First cut speed | First cut time | Roughness of the workpiece |
|---|---|---|---|---|
| Gamma type cutting line | 34.8 point | 2.26-2.46 mm/min | 14.4 point | Ra = 0.363 |
| Cutting line B | 32.0 point | 2.33-2.60 mm/min | 13.7 point | Ra = 0.371 |

4. From table 2, it can be seen that, on the condition that the surface roughness of the workpiece is basically the same, calculated by the total cutting time, the cutting efficiency is improved by 5.11%.

Embodiment 3

To manufacture a cutting line C with a diameter D0 of 0.25 mm in the present invention, the core material comprises 62.1 wt % of copper, 0.025 wt % of boron, 0.19 wt % of other metal elements which are iron and rare earth, less than 0.3 wt % of inevitable impurity elements and the allowance of zinc, and the metal surface comprises 37.0 wt % of copper, 0.10-2.8 wt % of oxygen, 0.10 wt % of iron, 0.005 wt % of rare earth, less than 0.3 wt % of inevitable impurity elements and the allowance of zinc.

Step 1: Purchase copper, zinc and boron in a raw materials market, choose and process the raw materials, mix the materials according to the requirements of the core material ingredients (wherein boron can be manufactured into intermediate alloy to be added), move the mixed materials to the melting site to melt the materials, and control the melting temperature to be 950-1,150° C. and the traction speed to be 1.0-4.0 m/min to produce a continuous cast rod blank with a diameter of 6.0-16.0 mm. This is the conventional continuous casting technology in the industry.

After surface treatment, plastically machine, re-crystallize and anneal the above continuous cast rod for several cycles to produce brass wires with a diameter of 1.0 mm and a copper content of 62.1 wt % (parent blank material 2), and then cover with a zinc layer with a thickness of 30 μm on the surface of the brass wire surfaces in a chemical method.

Step 2: Plastically process the parent material 2 into wire with a diameter of Φ0.5 mm.

Step 3: Thermally process the materials obtained in step 2 on a heating surface with an oxygen content of 10-30% and at a temperature of 420° C., keep the materials at the temperature of 420° C. for 9 h to form the materials (parent material 3), cool to 60° C. along with the surface and then discharge out of the furnace.

Step 4: Stretch the parent material 3 manufactured in step 2 with large power, remove the stress and anneal the material using a continuous-stretching-annealing device. This process is specifically as follows: when the workpiece is processed at a temperature of less than 650° C., the annealing and stretching speed (traction speed) is 850-1,500 m/min, the annealing distance is 0.5-10 m; then, the material undergoes post treatment in the annealing liquid (the annealing liquid is also called burning oil in the industry, commercially available, for example German multidraw DG type, domestic FX128, etc.); the temperature of the annealing liquid is 25-100° C.); reeling is also implemented; the finished product obtained through stretching is a cutting line with a diameter of 0.25 mm. The test result shows that the tensile strength of such cutting line is 1015 N/mm².

1. Cutting line C is compared with any β type brass cutting line available on the market.
2. The one-way wire winding machine used in the test is Mitsubishi FA10SADVANCE2009.
3. The test conditions are as follows: the size of the workpiece cut in the test is 60*6*6 (0.5*3 groove); the workpiece material is SKD11; the device parameter is NM; processing times include one time of course cutting and four times of fine trimming; the machining mode is immersion; the tension parameter of the device is adjusted to be applicable to 900 N/mm² cutting line; and the nozzle is pressed against the workpiece. The recorded cutting effects of the two types of cutting lines can be seen in table 3.

TABLE 3

Cutting effects of the two types of cutting lines in embodiment 3

| Type of the cutting line | Total machining time | First cut speed | First cut time | Roughness of the workpiece |
|---|---|---|---|---|
| β type cutting line | 33.3 point | 2.27-2.60 mm/min | 13.8 point | Ra = 0.387 |
| Cutting line C | 31.85 point | 2.40-2.73 mm/min | 13.2 point | Ra = 0.367 |

4. From table 3, it can be seen that, on the condition that the surface roughness of the workpiece is improved, calculated by the total cutting time, the cutting efficiency is improved by 4.55%, the speed improvement is not obvious, but the cutting line C is easier to process and has a certain cost superiority and is applicable to industrial production.

Embodiment 4

To manufacture a cutting line D with a diameter D0 of 0.25 mm in the present invention, the core material comprises 64.7 wt % of copper, 0.025 wt % of boron, 0.32 wt % of other metal elements which are iron and phosphorus, less than 0.3 wt % of inevitable impurity elements and the allowance of zinc, and the metal surface comprises 39.0 wt % of copper, 0.20-3.0 wt % of oxygen, 0.005 wt % of phosphorus, 0.12 wt % of iron, less than 0.3 wt % of inevitable impurity elements and the allowance of zinc.

Step 1: Purchase copper, zinc and boron in a raw materials market, choose and process the raw materials, mix the materials according to the requirements of the core material ingredients (wherein boron can be manufactured into intermediate alloy to be added), move the mixed materials to the melting site to melt the materials, and control the melting temperature to be 950-1,150° C. and the traction speed to be 1.0-4.0 m/min to produce the continuous cast rod blank with a diameter of 6.0-16.0 mm.

After surface treatment, plastically machine, re-crystallize and anneal the above continuous cast rod for several cycles to produce brass wires with a diameter of 0.9 mm and a copper content of 64.7 wt % (parent blank material 2), and then cover a zinc layer with a thickness of 33 μm on the surface of the brass wire surfaces using a chemical method.
Step 2: Plastically process the parent material 2 into wire with a diameter of Φ0.55 mm.
Step 3: Thermally process the materials obtained in step 2 on a heating surface with an oxygen content of 70-90% and at a temperature of 430° C., keep the materials at the temperature of 430° C. for 9.5 h to form the materials (parent material 3), cool to 60° C. along with the surface and then discharge out of the furnace.
Step 4: Stretch the parent material 3 manufactured in step 2 with large power, remove the stress and anneal the material using a continuous-stretching-annealing device (when the workpiece is processed at a temperature less than 650° C., the annealing speed (traction speed) is 850-1,500 m/min; the annealing distance is 0.5-10 m; then, the material undergoes the post treatment in the annealing liquid (the annealing liquid is also called burning oil in the industry, commercially available, for example German multidraw DG type, domestic FX128, etc.); the temperature of the annealing liquid is 25-100° C.; reeling is also implemented; the finished product obtained through stretching is a cutting line with a diameter of 0.25 mm. The test result shows that the tensile strength of such cutting line is 1005 N/mm².

1. Cutting line D is compared with any plated type brass cutting line available on the market.
2. The one-way wire winding machine used in the test is Mitsubishi FA10SADVANCE2009.
3. The test conditions are as follows: the size of the workpiece cut in the test is 60*6*6 (0.5*3 groove); the workpiece material is SKD11; the device parameter is NM; processing times include one time of course cutting and four times of fine trimming; the machining mode is immersion; the tension parameter of the device is adjusted to be applicable to 900 N/mm² cutting line; and the nozzle is pressed against the workpiece. The recorded cutting effects of the two types of cutting lines can be seen in table 4.

TABLE 4

Cutting effects of the two types of cutting lines in embodiment 4

| Type of the cutting line | Total machining time | First cut speed | First cut time | Roughness of the workpiece |
|---|---|---|---|---|
| Galvanized cutting line | 34.1 point | 2.37-2.70 mm/min | 14.8 point | Ra = 0.347 |
| Cutting line D | 32.15 point | 2.40-2.88 mm/min | 14.1 point | Ra = 0.361 |

4. From table 3, it can be seen that, on the condition that the surface roughness of the workpiece is slightly reduced (when the roughness is reduced by 0.2, use by the user is not affected), but the galvanized cutting line is easy to dust, and the cutting line of the present invention does not dust, and calculated by the total cutting time, the cutting efficiency is improved by 6.06%, and the cutting line D is easier to process, has a certain cost superiority and is applicable to industrial production.

What is claimed is:
1. A low-boron-oxygen cutting line for one-way wire winding, comprising a core material and a metal surface layer covering the core material;
   wherein the core material has an alloy composition of 55-65 wt % of copper, 0.001-0.03 wt % of boron, and 0.05-1.0 wt % of other elements, at least two of the other elements are selected from the group consisting of titanium, iron, silicon, nickel, manganese, aluminum, tin, phosphorus and rare earth, less than 0.5 wt % of inevitable impurity elements, and an allowance of zinc;

wherein the metal surface layer has an alloy composition of 35.0-45.0 wt % of copper, 0.001-3.0 wt % of oxygen, 0.0005-0.5 wt % of other elements, at least two of the other elements are selected from the group consisting of titanium, iron, silicon, nickel, manganese, aluminum, tin, phosphorus and rare earth, less than 0.5 wt % of inevitable impurity elements, and an allowance of zinc.

2. The low-boron-oxygen cutting line for one-way wire winding according to claim 1, wherein the core material has an alloy composition of 55-60 wt % of copper, 0.001-0.01 wt % of boron, 0.05-0.5 wt % of other elements, at least two of which are iron, phosphorus and rare earth and less than 0.3 wt % of inevitable impurity elements;

wherein the sum of the contents of the copper, zinc and boron is less than 99.5 wt %; wherein zinc content is greater than 39.5 wt %;

wherein the metal surface layer has an alloy composition of 40.0-45.0 wt % of copper, 0.001-3.0 wt % of oxygen, 0.0005-0.25 wt % of other elements, at least two of which are iron, phosphorus and rare earth and less than 0.3 wt % of inevitable impurity elements, and an allowance of zinc.

3. The low-boron-oxygen cutting line for one-way wire winding according to claim 1, wherein the core material has an alloy composition of 60-65 wt % of copper, 0.005-0.03 wt % of boron, 0.05-0.5 wt % of other elements, at least two of which are iron, phosphorus and rare earth and more than 0.3 wt % of inevitable impurity elements;

wherein the sum of the contents of the copper, zinc and boron is less than 99.5 wt %; wherein zinc content is greater than 34.5 wt %;

wherein the metal surface layer has an alloy composition of 35-40 wt % of copper, 0.10-3.0 wt % of oxygen, 0.0005-0.25 wt % of other elements, at least two of which are iron, phosphorus and rare earth and less than 0.3 wt % of inevitable impurity elements, and an allowance of zinc.

4. A manufacturing method of a low-boron-oxygen cutting line for one-way wire winding according to claim 1, comprising:

weighing according to a formula;

continuously casting at a temperature of 950-1,150° C. to form a brass rod blank;

plastically machining, recrystallizing and annealing the brass rod blank to generate a core material of the cutting line;

covering the core material with a layer of zinc through chemical electroplating or mechanical manner to form a raw blank;

thermally machining the raw blank in an oxidizing atmosphere with an oxygen content of 10-90 wt % at an air pressure of 0.5-12.5 MPa and a temperature of 250-450° C.;

keeping the blank at the temperature of 250-450° C. for 2.0-15.0 h;

cooling the blank to 60° C. as the furnace cools down to produce the metal surface layer containing copper, zinc and oxygen in the surface and obtain a tough blank of the cutting line;

continuously annealing the rough blank of the cutting line to produce the low-born-oxygen cutting line for one-way wire winding.

5. The manufacturing method of a low-boron-oxygen cutting line for one-way wire winding according to claim 4, wherein the thickness of the composite metal surface layer is greater than 5% of and less than 25% of the diameter of the low-boron-oxygen cutting line for one-way wire winding.

6. The manufacturing method of a low-boron-oxygen cutting line for one-way wire winding according to claim 4, wherein the total conductivity of the low-boron-oxygen cutting line for one-way wire winding is greater than 18.5% IACS and less than or equal to 25.5% IACS.

7. A low-boron-oxygen cutting line for one-way wire winding, comprising a core material and a metal surface layer covering the core material;

wherein the core material has an alloy composition of 55-65 wt % of copper, 0.001-0.03 wt % of boron, and 0.05-1.0 wt % of other elements, at least two of the other elements are selected from the group consisting of titanium, silicon, nickel, and phosphorus, less than 0.5 wt % of inevitable impurity elements, and an allowance of zinc;

wherein the metal surface layer his an alloy composition of 35.0-45.0 wt % of copper, 0.001-3.0 wt % of oxygen, 0.0005-0.5 wt % of other elements, at least two of the other elements are selected from the group consisting of iron, silicon, and phosphorus, less than 0.5 wt % of inevitable impurity elements, and an allowance of zinc.

* * * * *